(12) United States Patent
Kim et al.

(10) Patent No.: US 10,333,185 B2
(45) Date of Patent: Jun. 25, 2019

(54) BATTERY MODULE INCLUDING COOLING STRUCTURE IN WHICH COOLANT CHANNEL IS MINIMALLY BENT

(71) Applicant: LG CHEM, LTD., Seoul (KR)

(72) Inventors: Tae Hyuck Kim, Daejeon (KR); Nam In Kim, Daejeon (KR); Tae Hwan Roh, Daejeon (KR); Yoonhee Lee, Daejeon (KR); Junhee Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 212 days.

(21) Appl. No.: 15/504,405

(22) PCT Filed: Aug. 24, 2015

(86) PCT No.: PCT/KR2015/008798
§ 371 (c)(1),
(2) Date: Feb. 16, 2017

(87) PCT Pub. No.: WO2016/043441
PCT Pub. Date: Mar. 24, 2016

(65) Prior Publication Data
US 2017/0237130 A1   Aug. 17, 2017

(30) Foreign Application Priority Data
Sep. 15, 2014 (KR) .................... 10-2014-0121726

(51) Int. Cl.
*H01M 10/0525* (2010.01)
*H01M 10/65* (2014.01)
(Continued)

(52) U.S. Cl.
CPC .......... *H01M 10/65* (2015.04); *B60L 3/0046* (2013.01); *B60L 58/26* (2019.02); *H01M 2/1077* (2013.01);
(Continued)

(58) Field of Classification Search
CPC .................... H01M 10/052; H01M 10/0525
See application file for complete search history.

(56) References Cited

U.S. PATENT DOCUMENTS

2009/0258288 A1   10/2009   Weber et al.
2009/0325049 A1   12/2009   Niedzwiecki et al.
(Continued)

FOREIGN PATENT DOCUMENTS

CN   102057523 A   5/2011
CN   102473978 A   5/2012
(Continued)

OTHER PUBLICATIONS

International Search Report (PCT/ISA/210) issued in PCT/KR2015/008798, dated Oct. 22, 2015.
(Continued)

*Primary Examiner* — Olatunji A Godo
(74) *Attorney, Agent, or Firm* — Birch, Stewart, Kolasch & Birch, LLP

(57) ABSTRACT

Disclosed herein is a battery module configured to have a structure in which two or more unit modules, each of which includes one or more battery cells, a frame member configured to have a structure to surround outer edges of the one or more battery cells, the frame member including cooling manifold elements located at opposite ends of one side of the outer edges of the battery cells, and a cooling member mounted in the frame member such that the cooling member faces the battery cells while being in contact with the battery cells, the cooling member including a plate-shaped cooling fin having a shape and a size corresponding to those of the battery cells and a coolant conduit having a hollow structure located at an outer edge of the cooling fin, are arranged while being in tight contact with each other, wherein the coolant conduit includes a coolant inlet port and a coolant outlet port connected to the cooling manifold elements of the frame (Continued)

member of each of the unit modules in a communicating fashion.

25 Claims, 5 Drawing Sheets

(51) Int. Cl.
| | |
|---|---|
| H01M 10/6556 | (2014.01) |
| H01M 10/6554 | (2014.01) |
| H01M 2/10 | (2006.01) |
| H01M 10/625 | (2014.01) |
| H01M 10/647 | (2014.01) |
| H01M 10/6557 | (2014.01) |
| H01M 10/6555 | (2014.01) |
| H01M 10/613 | (2014.01) |
| B60L 3/00 | (2019.01) |
| B60L 58/26 | (2019.01) |

(52) U.S. Cl.
CPC ....... *H01M 10/613* (2015.04); *H01M 10/625* (2015.04); *H01M 10/647* (2015.04); *H01M 10/6554* (2015.04); *H01M 10/6555* (2015.04); *H01M 10/6556* (2015.04); *H01M 10/6557* (2015.04); *B60L 2240/545* (2013.01); *H01M 2220/20* (2013.01); *Y02T 10/7005* (2013.01); *Y02T 10/705* (2013.01); *Y02T 90/16* (2013.01)

(56) References Cited

U.S. PATENT DOCUMENTS

| | | |
|---|---|---|
| 2009/0325052 A1 | 12/2009 | Koetting et al. |
| 2011/0162820 A1 | 7/2011 | Weber et al. |
| 2011/0212356 A1 | 9/2011 | Tennessen et al. |
| 2011/0293982 A1* | 12/2011 | Martz ............... H01M 10/6551 429/120 |
| 2011/0293985 A1 | 12/2011 | Champion et al. |
| 2012/0040223 A1 | 2/2012 | Odumodu |
| 2013/0045410 A1 | 2/2013 | Yang et al. |
| 2013/0230754 A1* | 9/2013 | Jeong ................. H01M 10/613 429/83 |
| 2013/0266838 A1 | 10/2013 | Von Borck et al. |
| 2014/0335390 A1 | 11/2014 | Hwang et al. |

FOREIGN PATENT DOCUMENTS

| | | |
|---|---|---|
| CN | 102884673 A | 1/2013 |
| CN | 105428750 A | 1/2013 |
| JP | 2011-526728 A | 10/2011 |
| JP | 2013-526766 A | 6/2013 |
| JP | 2013-537999 A | 10/2013 |
| KR | 10-2009-0000313 A | 1/2009 |
| KR | 10-2010-0003135 A | 1/2010 |
| KR | 10-2011-0126764 A | 11/2011 |
| KR | 10-2013-0008142 A | 1/2013 |
| KR | 10-2013-0062056 A | 6/2013 |
| KR | 10-2014-0100605 A | 8/2014 |

OTHER PUBLICATIONS

Extended European Search Report dated Sep. 21, 2017, for corresponding European Application No. 15842338.4.

* cited by examiner

[FIG. 1]
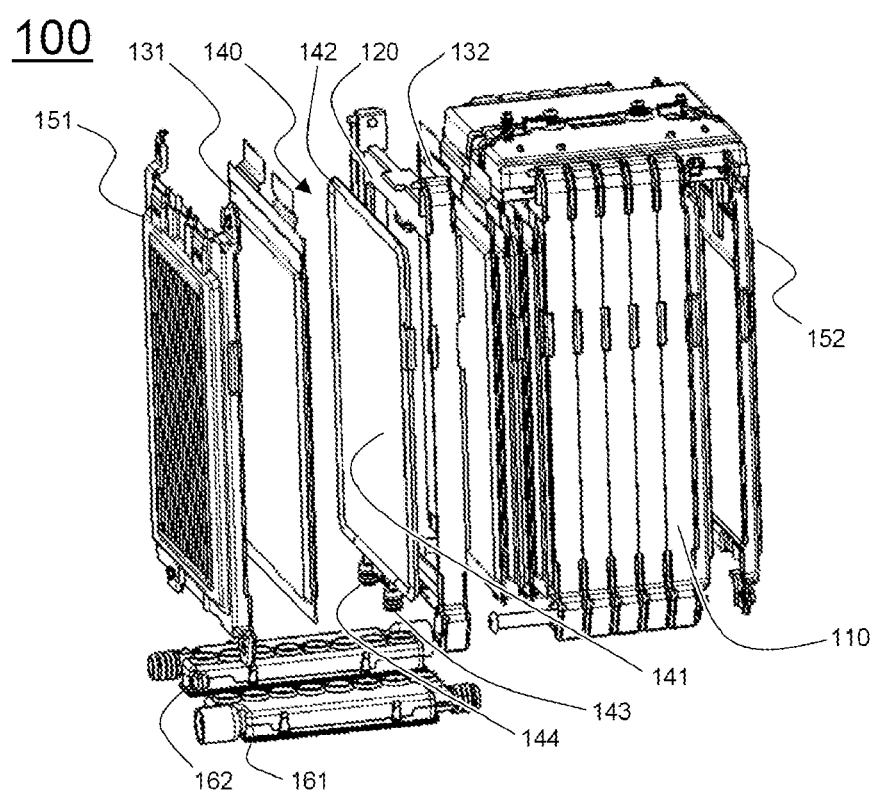

[FIG. 2]
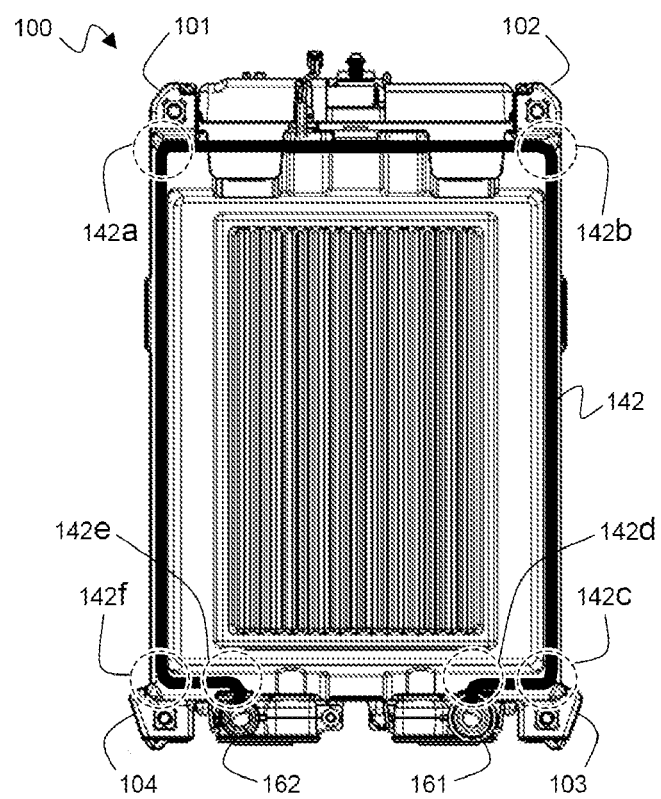

【FIG. 3】
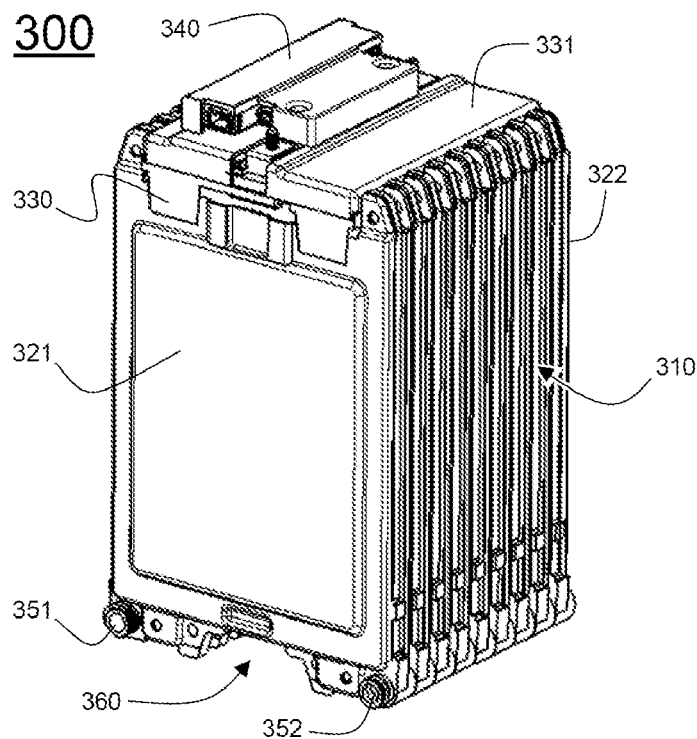
【FIG. 4】
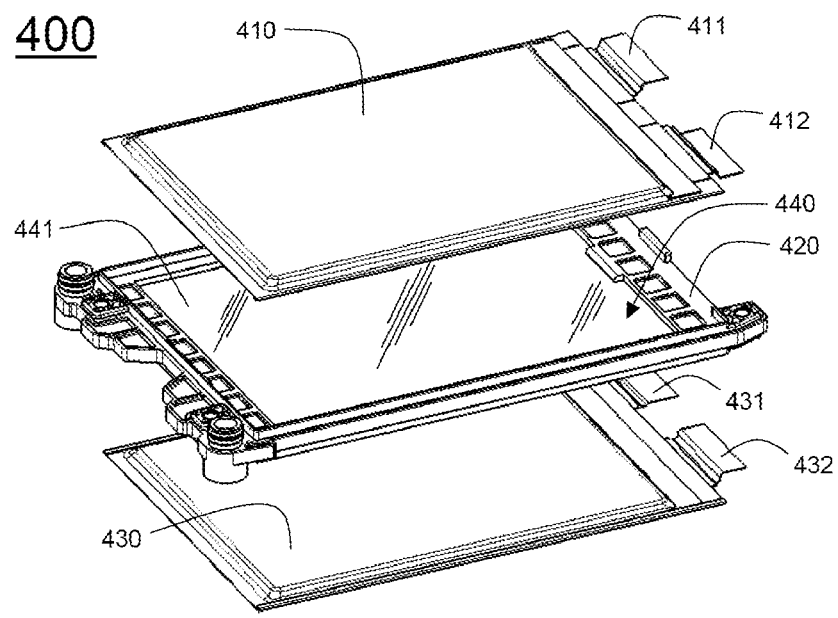

[FIG. 5]
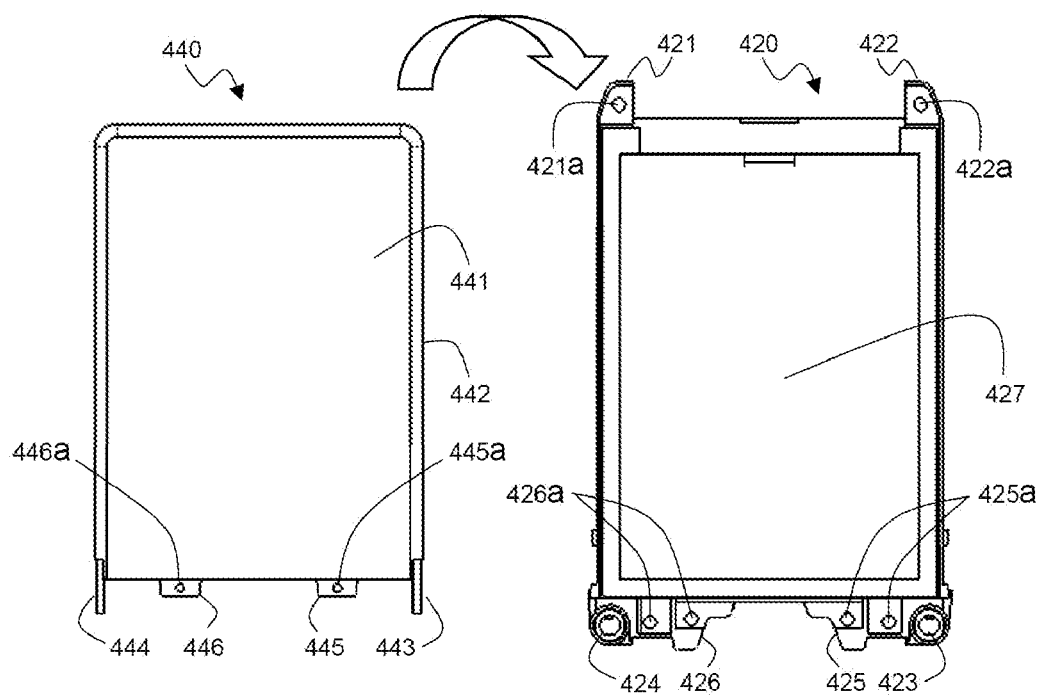
[FIG. 6]
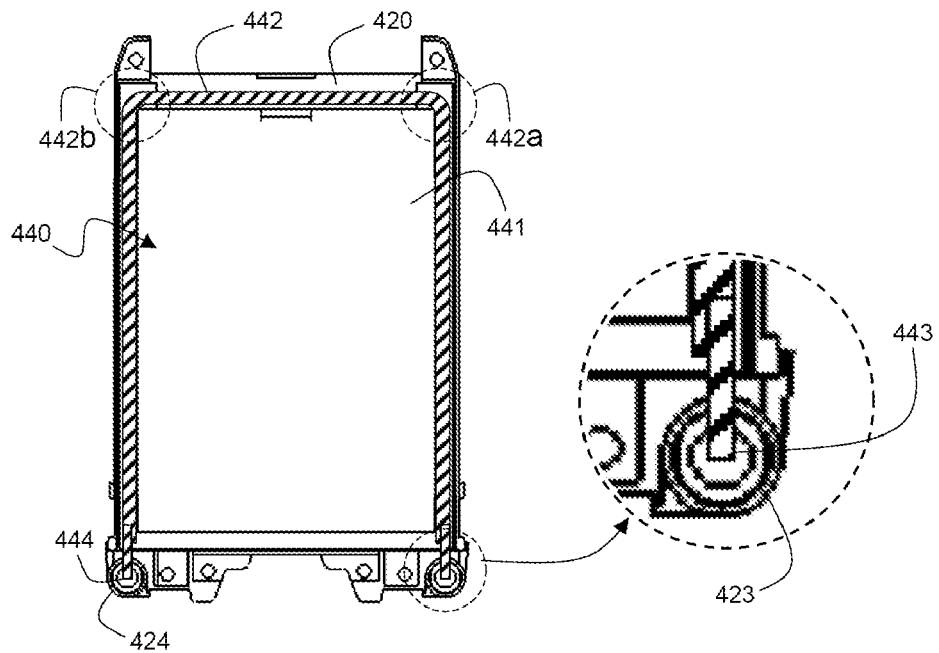

[FIG. 7]
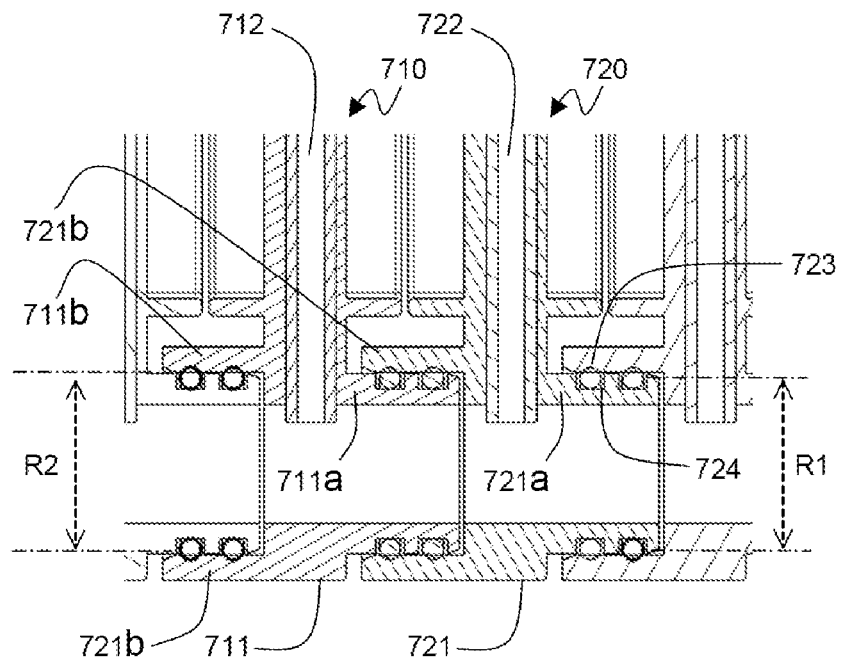
[FIG. 8]
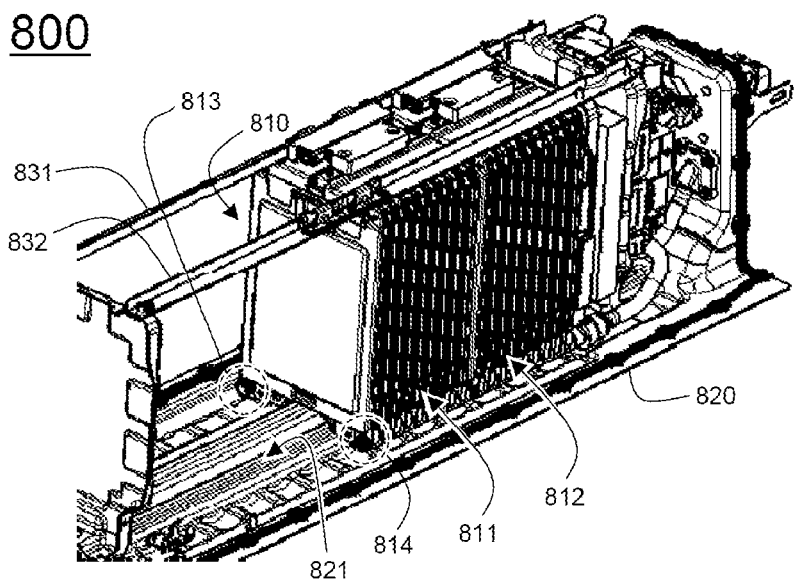

BATTERY MODULE INCLUDING COOLING STRUCTURE IN WHICH COOLANT CHANNEL IS MINIMALLY BENT

TECHNICAL FIELD

The present invention relates to a battery module including a cooling structure in which a coolant channel is minimally bent.

BACKGROUND ART

As energy prices are increasing due to depletion of fossil fuels and interest in environmental pollution is escalating, the demand for environmentally-friendly alternative energy sources is bound to play an increasing role in the future. Thus, research into techniques for generating various powers, such as nuclear energy, solar energy, wind energy, and tidal power, is underway, and power storage devices for more efficient use of the generated energy are also drawing much attention.

In particular, the demand for batteries as energy sources is rapidly increasing as mobile device technology continues to develop and the demand for the mobile devices continues to increase. In recent years, the use of secondary batteries as a power source of electric vehicles (EV) and hybrid electric vehicles (HEV) has been realized, and the market for lithium secondary batteries continues to expand to applications such as auxiliary power suppliers through smart-grid technology. Accordingly, much research on batteries satisfying various needs has been carried out.

Typically, small-sized mobile devices use one or several battery cells for each device. On the other hand, middle or large-sized devices, such as vehicles, use a middle or large-sized battery module including a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the weight of the pouch-shaped battery is small, and it is easy to modify the shape of the pouch-shaped battery.

Battery cells constituting the middle or large-sized battery module may be secondary batteries which can be charged and discharged. During charge and discharge of such a high-output, large-capacity secondary battery, a larger amount of heat is generated from the battery. In particular, the laminate sheet of each pouch-shaped battery widely used in the battery module has a polymer material exhibiting low thermal conductivity coated on the surface thereof with the result that it is difficult to effectively lower overall temperature of the battery cells.

In addition, if the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, the middle or large-sized battery module or a middle or large-sized battery pack for vehicles, which is a high-output, large-capacity battery, including a plurality of middle or large-sized battery modules needs a cooling system to cool battery cells mounted therein.

Each battery module mounted in the middle or large-sized battery pack is generally manufactured by stacking a plurality of battery cells with high integration. In this case, the battery cells are stacked in a state in which the battery cells are arranged at predetermined intervals such that heat generated during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a frame member, such as a cartridge, to constitute a unit module, and a plurality of unit modules may be stacked to constitute a battery module.

FIG. 1 is an exploded view schematically showing the structure of unit modules constituting a conventional battery module, and FIG. 2 is a typical view schematically showing the structure of the battery module of FIG. 1 when viewed from the front of the battery module.

Referring to FIGS. 1 and 2, a battery module 100 is configured to have a structure in which a plurality of unit modules 110 is arranged in tight contact with one another. The battery module 100 is generally formed in a hexahedral shape.

Each of the unit modules 110 is configured such that two plate-shaped battery cells 131 and 132 face each other while contacting each other in a state in which a frame member 12 is disposed between the battery cells 131 and 132. A cooling member 140 is interposed between the two plate-shaped battery cells 131 and 132, specifically between the frame member 120 and the battery cell 131 and/or between the frame member 120 and the battery cell 132. Cover members 151 and 152 are coupled to the front and the rear of the battery module 100, respectively.

The cooling member 140 generally has a structure corresponding to the shape and the size of the plate-shaped battery cells 131 and 132. Specifically, the cooling member 140 includes a plate-shaped cooling fin 141 having a shape and a size corresponding to those of the battery cells 131 and 132 and a coolant conduit 142 disposed along the outer edge of the cooling fin 141. The coolant conduit 142 has a hollow structure.

The coolant conduit 142 includes a coolant inlet port 143 and a coolant outlet port 144 provided at a central region of the lower side of the cooling fin 141. The coolant inlet port 143 and the coolant outlet port 144 of the coolant conduit 142 are coupled respectively to cooling manifolds 161 and 162 located at the lower part of the battery module 100 in a communicating fashion.

The battery module 100 is generally formed in a rectangular shape when viewed from the front of the battery module 100. The battery module 100 is provided at corners thereof with fastening parts 101, 102, 103, and 104 for coupling the unit modules.

The cooling manifolds 161 and 162 are coupled to the lower part of the battery module 100. Specifically, the cooling manifolds 161 and 162 are coupled respectively to the coolant inlet port and the coolant outlet port of the coolant conduit 142 formed at the central region of the lower side of the cooling fin in a communicating fashion.

At this time, the coolant inlet port 143 and the coolant outlet port 144 are located adjacent to an approximately central region of the lower part of the battery module 100. When a coolant introduced through the cooling manifold

161 passes through the coolant inlet port 143 of the coolant conduit 142 and is then discharged through the cooling manifold 162 connected to the coolant outlet port 144, therefore, the coolant is circulated along the outer edge of the cooling fin 141, thereby maximizing cooling efficiency of the battery module 100.

In the conventional battery module 100 with the above-stated construction, the coolant conduit 142 of the cooling member 140, which is provided along the outer edge of the cooling fin 141, is bent at six points 142a, 142b, 142c, 142d, 142e, and 142f As a result, manufacturing cost of the cooling member 140 is increased. Furthermore, the pressure of the coolant along the outer edge of the cooling fin 141 through the coolant conduit 142 is lowered due to the bent structures with the result that the cooling efficiency of the battery module 100 may be lowered.

In addition, the cooling manifolds 161 and 162 are coupled to the central region of the lower part of the battery module 100 at which the coolant inlet port 143 and the coolant outlet port 144 are located. At the time of manufacturing the battery module, therefore, it is necessary to individually couple the cooling manifolds 161 and 162 to the coolant inlet port 143 and the coolant outlet port 144 of the cooling member 140 of each of the unit modules 110 with the result that manufacturing time of the battery module 100 is increased. Furthermore, at the time of manufacturing a battery pack including two or more battery modules 100, the cooling manifolds 161 and 162 are located between each of the battery modules 100 and a tray assembly. As a result, it is not possible to directly inspect a coupling state between the cooling manifolds 161 and 162 and the coolant inlet port 143 and the coolant outlet port 144 with the naked eye, whereby a product defect rate is increased.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that in a case in which a battery module is configured to have a structure in which a frame member is provided at opposite ends of one side thereof with cooling manifold elements in an integrated fashion, and a coolant channel defined by a coolant conduit connected to the cooling manifold elements is generally formed in a U-shape, it is possible to minimize bending of the coolant conduit, thereby reducing manufacturing cost of the battery module, to prevent the reduction in pressure of a coolant, thereby improving cooling efficiency of the battery module, and to inspect coupling regions of the cooling manifold elements with the naked eye, thereby minimizing a product defect rate. The present invention has been completed based on these findings.

Technical Solution

In accordance with one aspect of the present invention, the above and other objects can be accomplished by the provision of a battery module configured to have a structure in which two or more unit modules, each of which includes one or more battery cells, a frame member configured to have a structure to surround outer edges of the one or more battery cells, the frame member including cooling manifold elements located at opposite ends of one side of the outer edges of the battery cells, and a cooling member mounted in the frame member such that the cooling member faces the battery cells while being in contact with the battery cells, the cooling member including a plate-shaped cooling fin having a shape and a size corresponding to those of the battery cells and a coolant conduit having a hollow structure located at an outer edge of the cooling fin, are arranged while being in tight contact with each other, wherein the coolant conduit includes a coolant inlet port and a coolant outlet port connected to the cooling manifold elements of the frame member of each of the unit modules in a communicating fashion.

The battery module according to the present invention is configured to have a structure in which the frame member is provided at opposite ends of one side thereof with the cooling manifold elements in an integrated fashion, and a coolant channel defined by the coolant conduit connected to the cooling manifold elements is generally formed in a U-shape, whereby it is possible to minimize bending of the coolant conduit, thereby reducing manufacturing cost of the battery module, to prevent the reduction in pressure of a coolant, thereby improving cooling efficiency of the battery module, and to inspect coupling regions of the cooling manifold elements with the naked eye, thereby minimizing a product defect rate.

In a concrete example, the kind of each of the battery cells is not particularly restricted so long as each of the battery cells is configured to have a structure in which the battery cells can face each other in a state in which the frame member, at which the cooling member is mounted, is disposed between the battery cells. Specifically, each of the battery cells may be configured to have a structure in which an electrode assembly, which is configured to have a structure including a positive electrode, a negative electrode, and a separator disposed between the positive electrode and the negative electrode, is mounted in a receiving part of a pouch-shaped battery case made of a laminate sheet including a resin layer and a metal layer.

In addition, the frame member has a hollow structure to surround the outer edges of the battery cells, and includes the plate-shaped cooling fin having the shape and the size corresponding to those of the battery cells. Consequently, the cooling fin is exposed to the outside. As a result, the exposed cooling fin directly faces the battery cells while being in contact with the battery cells, thereby improving cooling efficiency.

Meanwhile, the cooling manifold elements may each have a structure extending through the frame member.

In this case, the cooling manifold elements may each have a hollow structure extending from one surface to the other surface of the frame member.

Specifically, the frame member constituting each of the unit modules of the battery module according to the present invention is configured to have a plate-shaped structure based on the shape of each of the battery cells. At this time, the cooling manifold elements may be formed at opposite ends of one side of the outer edge of each of the battery cells, and the cooling manifold elements may each have a hollow structure extending from one surface to the other surface of the plate-shaped frame member.

In addition, the cooling manifold elements of the unit modules may be connected to each other in a communication fashion.

Specifically, each of the unit modules includes the frame member at which the cooling manifold elements are formed, and the cooling manifold elements are formed at the same regions of the unit modules such that each of the cooling manifold elements has a hollow structure. In a case in which two or more unit modules are arranged in tight contact with each other to constitute a battery module, therefore, the cooling manifold elements of the unit modules may be connected to each other in a communication fashion.

Consequently, the battery module according to the present invention does not need additional cooling manifolds to supply and discharge a coolant through the coolant inlet port and the coolant outlet port formed at the coolant conduit of the cooling member, and it is possible to more easily configure the cooling manifold through connection of the cooling manifold elements based on arrangement of the unit modules.

At this time, airtight gaskets may be disposed at connection regions of the cooling manifold elements.

In a case in which the cooling manifold elements of the unit modules are connected to each other in a communication fashion, therefore, it is possible to effectively prevent poor coupling and leakage of water, which may occur due to a slight size difference, wear, or deformation of the cooling manifold elements.

In a concrete example, the frame member may be integrally formed with the cooling member, for example, by injection molding.

Specifically, the frame member may be manufactured by injection molding of a plastic resin or a polymer resin. At this time, the cooling member may be made of a metal, such as aluminum, exhibiting high thermal conductivity and may be integrally formed with the frame member in a state in which the cooling member is mounted in the frame member, during injection molding of the frame member.

Consequently, the frame member has a hollow structure to surround the outer edges of the battery cells. The coolant conduit of the cooling member and a portion of the cooling fin adjacent to the coolant conduit may be stably mounted and fixed to the frame member by injection molding. The remaining region of the cooling fin made of a metal, such as aluminum, is exposed to the outside such that the cooling fin directly faces the battery cells, thereby exhibiting an excellent cooling effect.

Meanwhile, the coolant conduit may be integrally formed with the cooling fin.

Specifically, the cooling conduit is located at the outer edge of the cooling fin. In a case in which the cooling conduit is integrally formed with the cooling fin, structural stability is improved. At this time, the cooling conduit and the cooling fin may be made of the same material.

In addition, the coolant conduit may be configured to have a structure to surround the outer edge of the cooling fin excluding one side of the cooling fin corresponding to regions of the coolant conduit at which the coolant inlet port and the coolant outlet port are formed.

Specifically, the coolant conduit is located at the outer edge of the cooling fin, and the coolant inlet port and the coolant outlet port of the coolant conduit are connected to the respective cooling manifold elements of the frame member in a communicating fashion. At this time, the cooling manifold elements are located at opposite ends of one side of the outer edge of each of the battery cells. The coolant inlet port and the coolant outlet port of the coolant conduit connected to the respective cooling manifold elements based on the above structure are located at regions corresponding to the opposite ends of one side of the outer edge of each of the battery cells. Consequently, the coolant conduit may be configured to have a structure to surround the outer edge of the cooling fin excluding one side of the cooling fin corresponding to one side of each of the battery cells.

In the above structure, the coolant conduit may be generally formed in a U-shape, and the coolant channel defined by the coolant conduit may also be generally formed in a U-shape.

Consequently, the coolant channel formed in the battery module according to the present invention may be minimally bent as compared with the coolant channel of the conventional battery module. As a result, it is possible to reduce cost related to bending of the coolant conduit, thereby reducing overall manufacturing cost of the battery module. In addition, it is possible to prevent or minimize the reduction in pressure of a coolant flowing in the coolant conduit, thereby improving cooling efficiency Meanwhile, the coolant inlet port and the coolant outlet port of the coolant conduit may be located such that ends of the coolant inlet port and the coolant outlet port are directed toward the bottom of the battery module.

At this time, the bottom of the battery module may mean one surface of the battery module facing the top of the tray assembly in a case in which the battery module, which generally has a hexahedral shape, is arranged on the tray assembly to constitute a battery pack.

In a concrete example, the frame member may include upper end fastening extensions formed by extending in a protruding fashion opposite ends of the other side of the frame member opposite to one side of the frame member at which the cooling manifold elements are formed, and upper end fastening holes may be formed in the upper end fastening extensions, for example, by drilling.

In addition, the frame member may include one or more lower end fastening extensions extending in a protruding fashion from regions of the frame member at which the cooling manifold elements are formed, and lower end fastening holes may be formed in the lower end fastening extensions, for example, by drilling.

At this time, fastening beams for fixing the unit modules at correct positions may be inserted through the upper end fastening holes and the lower end fastening holes such that the unit modules are stably arranged in tight contact with each other and are fixed at correct positions, whereby it is possible to configure the battery module such that the battery module has a stable structure.

Meanwhile, the cooling fin of the cooling member may be provided at one side thereof at which the coolant inlet port and the coolant outlet port of the coolant conduit are located with one or more fixing and fastening extensions formed by extending portions of the cooling fin in a protruding fashion such that the fixing and fastening extensions are adjacent to the coolant inlet port and the coolant outlet port, and fixing and fastening holes may be formed in the fixing and fastening extensions, for example, by drilling.

At this time, the cooling member may be fixed to the frame member by inserting fixing and fastening members through the fixing and fastening holes and the frame member.

Specifically, the frame member is integrally formed with the cooling member by injection molding as described above. The fixing and fastening holes of the fixing and fastening extensions formed at the cooling fin of the cooling member may function as a reference point for positioning the cooling member in a mold for injection molding of the frame member.

In addition, the cooling member is fixed to the frame member by inserting the fixing and fastening members through the fixing and fastening holes of the fixing and fastening extensions formed at the cooling fin and the frame member. Consequently, it is possible to prevent release of the cooling member due to damage to the frame member, which has relatively low strength.

In accordance with another aspect of the present invention, there is provided a battery pack including the battery module with the above-stated construction, wherein the battery pack is configured to have a structure in which a battery module assembly, which is configured to have a structure in which two or more battery modules are arranged in tight contact with each other, is loaded on the top of a tray assembly.

At this time, the battery module assembly may be configured to have a structure in which cooling manifold elements are arranged such that the cooling manifold elements are directed toward the top of the tray assembly.

In connection with this case, the cooling manifold elements are located at opposite ends of one side of each of the unit modules. As a result, the cooling manifold elements are located at opposite ends of the bottom of the battery module assembly facing the top of the tray assembly. Consequently, a tunnel-shaped space may be defined between the cooling manifold elements at a region between the top of the tray assembly and the bottom of the battery module assembly.

In this case, the tray assembly may include a reinforcement bead provided at the top thereof facing the battery module assembly such that the reinforcement bead is located in the space defined between the cooling manifold elements of the battery module assembly.

That is, in the battery module according to the present invention and the battery pack including the battery module, the cooling manifold elements may be formed at opposite ends of the bottom of the battery module assembly facing the tray assembly so as to form a predetermine space. In addition, the reinforcement bead may be disposed in the space, thereby improving rigidity of the tray assembly and thus improving structural stability of the battery pack.

At this time, the reinforcement bead may have a height equivalent to 10% to 90%, specifically 50% to 70%, the distance between the battery module assembly and the top of the tray assembly in the space defined between the cooling manifold elements. In addition, the reinforcement bead has a width equivalent to 10% to 90%, specifically 50% to 70%, the width between the cooling manifold elements in the space defined between the cooling manifold elements.

If the height and/or the width of the reinforcement bead is too small, it is not possible to improve rigidity of the tray assembly to a desired level. On the other hand, if the height and/or the width of the reinforcement bead is too large, the reinforcement bead may damage the battery module assembly when the reinforcement bead is deformed due to external impact.

In a concrete example, the reinforcement bead may be integrally formed on the top of the tray assembly. However, the present invention is not limited thereto. On the other hand, the reinforcement bead may be formed on an additional member coupled to the top of the tray assembly.

In a case in which the reinforcement bead is integrally formed on the top of the tray assembly, the reinforcement bead and the tray assembly may be made of the same material during molding of the tray assembly. Consequently, it is possible to reduce process time, thereby improving productivity.

On the other hand, in a case in which the reinforcement bead is formed on an additional member coupled to the top of the tray assembly, the reinforcement bead may be made of various materials based on desired rigidity. In addition, a reinforcement bead having an appropriate shape may be selectively applied and coupled to the tray assembly based on various shapes of the space defined between the cooling manifold elements at the bottom of the battery module assembly facing the top of the tray assembly. Consequently, an applicable range of the tray assembly may be increased.

In addition, it is not necessary to individually manufacture tray assemblies having different tops and reinforcement bead structures based on various shapes of the space defined between the cooling manifold elements, whereby it is possible to reduce manufacturing cost of molds for manufacturing different tray assemblies.

In a concrete example, one or more fixing beams may be further coupled to one surface of the battery module assembly opposite to the other surface of the battery module assembly facing the top of the tray assembly. As a result, it is possible to prevent movement of the battery module assembly in the battery pack and to fix the battery modules constituting the battery module assembly at correct positions.

In accordance with a further aspect of the present invention, there is provided a device including one or more battery packs with the above-stated construction. The device may be any one selected from a group consisting of a power tool, an electric vehicle, a hybrid electric vehicle, a plug-in hybrid electric vehicle, and a power storage device.

The devices are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded view schematically showing the structure of unit modules constituting a conventional battery module;

FIG. 2 is a typical view schematically showing the structure of the battery module of FIG. 1 when viewed from the front of the battery module;

FIG. 3 is a typical view schematically showing the structure of a battery module according to an embodiment of the present invention;

FIG. 4 is an exploded view schematically showing the structure of a unit module constituting the battery module of FIG. 3;

FIG. 5 is a typical view schematically showing the structure of a cooling member and a frame member constituting the unit module of FIG. 4;

FIG. 6 is a typical view schematically showing a structure in which the cooling member and the frame member of FIG. 5 are integrated by injection molding;

FIG. 7 is a vertical sectional view schematically showing the structure of coupling regions between cooling manifold elements of unit modules in the battery module according to the embodiment of the present invention; and FIG. 8 is a typical view schematically showing the structure of a battery pack according to another embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 3 is a typical view schematically showing the structure of a battery module according to an embodiment of the present invention.

Referring to FIG. 3, a battery module 300 is configured to have a structure in which two or more unit modules 310 are arranged in tight contact with each other. The battery module 300 is generally formed in a hexahedral shape.

Cover members 321 and 322 are coupled respectively to the front and the rear of the battery module 300 such that the cover members 321 and 322 cover battery cells of the outermost unit modules 310 exposed to the outside. Consequently, it is possible to prevent the outermost battery cells from being damaged or contaminated due to external impact or contaminants, such as foreign matter.

An integrated circuit board (ICB) 330 is mounted at the top of the battery module 300. The integrated circuit board 330 is covered by an integrated circuit board cover 331.

A CVTN assembly 340 is mounted at the top of the integrated circuit board cover 331.

Cooling manifold elements 351 and 352 of each of the unit modules 310 are connected to the lower part of the battery module 300 in a communicating fashion. The cooling manifold elements 351 and 352 extend along opposite ends of the lower part of the battery module 300 in straight lines.

As a result, the cooling manifold elements 351 and 352 are exposed to the outside, and therefore it is possible to inspect coupling regions of the cooling manifold elements 351 and 352 with the naked eye, thereby minimizing a product defect rate.

In addition, a tunnel-shaped space 360 is defined between the cooling manifold elements 351 and 352 at the lower part of the battery module 300. In a case in which a battery module assembly, which is configured to have a structure in which two or more battery modules 300 are arranged in tight contact with each other, is loaded on the top of a tray assembly to manufacture a battery pack, therefore, a reinforcement member may be provided in the space 360 defined between the bottom of the battery module assembly and the top of the tray assembly so as to increase rigidity of the battery pack, thereby improving structural stability of the battery pack.

FIG. 4 is an exploded view schematically showing the structure of a unit module constituting the battery module according to the embodiment of the present invention.

Referring to FIG. 4, a unit module 400 is configured to have a structure in which two battery cells 410 and 430 face each other in a state in which a frame member 420 and a cooling member mounted at the frame member 420 are disposed between the battery cells 410 and 430.

Each of the battery cells 410 and 430 is configured to have a plate-shaped structure in which an electrode assembly, which is configured to have a structure including a positive electrode, a negative electrode, and a separator disposed between the positive electrode and the negative electrode, is mounted in a receiving part of a pouch-shaped battery case made of a laminate sheet including a resin layer and a metal layer.

The battery cell 410 is provided at one side thereof with electrode terminals 411 and 412 in a protruding fashion. In the same manner, the battery cell 430 is provided at one side thereof with electrode terminals 431 and 432 in a protruding fashion. The electrode terminals 411, 412, 431, and 432 of the battery cells 410 and 430 protrude in the same direction.

The frame member 420 is disposed between the battery cells 410 and 430. The frame member 420 is formed in a rectangular shape having a hollow structure to surround outer edges of the battery cells 410 and 430.

The frame member 420 is integrally formed with the cooling member 440 by injection molding. The cooling member 440 is mounted in the frame member 420. As a result, a cooling fin 441 of the cooling member 440 is exposed through a hollow region of the frame member 420 such that the cooling fin 441 faces the battery cells 410 and 430 while contacting the battery cells 410 and 430.

FIG. 5 is a typical view schematically showing the structure of the cooling member and the frame member constituting the unit module of FIG. 4.

Referring to FIG. 5, the cooling member 440 includes a plate-shaped cooling fin 441 having a shape and a size corresponding to those of the battery cells and a coolant conduit 442 disposed along the outer edge of the cooling fin 441. The coolant conduit 442 has a hollow structure.

The coolant conduit 442 includes a coolant inlet port and a coolant outlet port. The coolant inlet port 443 and the coolant outlet port 444 are located at opposite ends of the lower side of the cooling fin 441. Consequently, the coolant conduit 442 is configured to have a structure to surround the outer edge of the cooling fin 441 excluding the lower side of the cooling fin 441 at which the coolant inlet port 443 and the coolant outlet port 444 are located.

As a result, the coolant conduit 442 is generally formed in a U-shape. Consequently, the coolant conduit 442 is minimally bent as compared with the conventional battery module, thereby reducing manufacturing cost of the battery module.

The cooling fin 441 is provided at the lower side thereof with fixing and fastening extensions 445 and 446, which are formed by extending portions of the cooling fin 441 in a protruding fashion. The fixing and fastening extensions 445 and 446 are located adjacent to the coolant inlet port 443 and the coolant outlet port 444. Fixing and fastening holes 445a and 446a are formed in the fixing and fastening extensions 445 and 446, respectively, by drilling.

Consequently, the cooling member 440 may be stably fixed to the frame member 420 by inserting fixing and fastening members through the fixing and fastening holes 445a and 446a and the frame member 420.

The frame member 420 also has a shape and a size corresponding to those of the battery cells. The frame member 420 is configured to have a hollow structure, in which a middle region 420 is open, such that the frame member 320 surrounds the outer edges of the battery cells.

The frame member 420 is provided at opposite ends of the lower side thereof with cooling manifold elements 423 and 424, respectively.

The frame member 420 is provided at the upper side thereof with upper end fastening extensions 421 and 422, which are formed by extending opposite ends of the upper side of the frame member 420 in a protruding fashion. Upper end fastening holes 421a and 422a are formed in the upper end fastening extensions 421 and 422, respectively, by drilling.

In addition, the frame member 420 is provided at the lower side thereof with lower end fastening extensions 425 and 426 extending in a protruding fashion from the regions of the frame member 420 at which the cooling manifold elements 423 and 424 are formed. Lower end fastening holes 425a and 426a are formed in the lower end fastening extensions 425 and 426, respectively, by drilling.

Fastening beams for fixing the unit modules at correct positions are inserted through the upper end fastening holes 421a and 422a and the lower end fastening holes 425a and 426a. As a result, the unit modules are stably arranged while being in tight contact with each other, and are fixed at correct positions such that the battery module is configured to have a stable structure.

The frame member 420 is integrally formed with the cooling member 440 by injection molding. A structure in which the cooling member 440 and the frame member 420 are integrated by injection molding is shown in a schematic typical view of FIG. 6.

Referring to FIG. 6 together with FIG. 5, the cooling member 440 is integrally formed with the frame member 420 by injection molding. The coolant conduit 442 of the cooling member 440 and a portion of the cooling fin 441 adjacent to the coolant conduit 442 is mounted in the frame member 420.

The coolant inlet port 443 and the coolant outlet port 444 of the coolant conduit 442 are connected to the cooling manifold elements 423 and 424, respectively, in a communicating fashion. When a coolant introduced through the cooling manifold element 423 passes through the coolant inlet port 443 and the coolant outlet port 444 and is then discharged through the cooling manifold element 424, therefore, the coolant is circulated along the cooling conduit 442.

A coolant channel defined by the cooling conduit 442 has two bent regions 442a and 442b. As a result, the coolant channel is generally formed in a U-shape.

Consequently, the coolant channel is minimally bent as compared with the conventional battery module, thereby preventing the reduction in pressure of the coolant and thus improving overall cooling efficiency of the battery module.

FIG. 7 is a vertical sectional view schematically showing the structure of coupling regions between cooling manifold elements of unit modules in the battery module according to the embodiment of the present invention.

Referring to FIG. 7, cooling manifold elements 711 and 721 each are configured to have a hollow structure extending from one surface to the other surface of the frame member. In addition, the cooling manifold elements 711 and 712 communicate with coolant inlet ports 712 and 722, respectively.

One ends 711a and 721a of the cooling manifold elements 711 and 721 have an outer diameter R1 corresponding to an inner diameter R2 of the other ends 711b and 721b of the cooling manifold elements 711 and 721. When unit modules 710 and 720 are arranged while being in tight contact with each other to manufacture the battery module, therefore, one end 711a of the cooling manifold element 711 formed at one of the unit modules 710 is inserted into the other end 721b of the cooling manifold element 721 formed at the other unit module 720.

Grooves 724 having a predetermined depth are formed at the ends 711a and 721a of the cooling manifold elements 711 and 712 such that the grooves 724 extend along the outer surfaces of the ends 711a and 721a of the cooling manifold elements 711 and 712. An airtight gasket 723, such as an O-ring, is disposed in each of the grooves 724.

Consequently, it is possible to effectively prevent poor coupling and leakage of water, which may occur due to a slight size difference, wear, or deformation of the cooling manifold elements 711 and 721, at the coupling regions between one ends 711a and 721a and the other ends 711b and 721b of the cooling manifold elements 711 and 721.

FIG. 8 is a typical view schematically showing the structure of a battery pack according to another embodiment of the present invention.

Referring to FIG. 8, a battery pack 800 is configured to have a structure in which a battery module assembly 810, which is configured to have a structure in which two or more battery modules 811 and 812 are arranged in tight contact with each other, is loaded on the top of a tray assembly 820.

In the battery module assembly 810, cooling manifold elements 813 and 814 are arranged such that the cooling manifold elements 813 and 814 are directed toward the top of the tray assembly 820.

A reinforcement bead 821 is provided at the top of the tray assembly 820 facing the battery module assembly 810 such that the reinforcement bead 821 is located in a space defined between the cooling manifold elements 813 and 814 of the battery module assembly 810.

Consequently, the rigidity of the tray assembly 820 is improved as compared with a conventional battery pack including battery modules, whereby overall structural stability of the battery pack 800 is improved.

In addition, two fixing beams 831 and 832 are further coupled to the top of the battery module assembly 810. As a result, movement of the battery module assembly 810 in the battery pack 800 is prevented, and the battery modules 811 and 812 constituting the battery module assembly 810 are fixed at correct positions.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention is configured to have a structure in which a frame member is provided at opposite ends of one side thereof with cooling manifold elements in an integrated fashion, and a coolant channel defined by a coolant conduit connected to the cooling manifold elements is generally formed in a U-shape, whereby it is possible to minimize bending of the coolant conduit, thereby reducing manufacturing cost of the battery module. In addition, it is possible to prevent the reduction in pressure of a coolant, thereby improving cooling efficiency of the battery module. Furthermore, it is possible to inspect coupling regions of the cooling manifold elements with the naked eye, thereby minimizing a product defect rate.

The invention claimed is:

1. A battery module comprising:
two or more unit modules, wherein each of the unit modules comprises:
one or more battery cells;
a frame member configured to have a structure to surround outer edges of the one or more battery cells, the frame member comprising cooling manifold elements located at opposite ends of one side of the outer edges of the frame member; and
a cooling member mounted in the frame member such that the cooling member faces the battery cells while being in contact with the battery cells, the cooling member comprising:
a plate-shaped cooling fin having a shape and a size corresponding to those of the battery cells; and a coolant conduit having a hollow structure located along a first side edge, a top and a second side edge of the cooling fin, are arranged while being in tight contact with each other, wherein the coolant conduit comprises a coolant inlet port at a first end of the coolant conduit and a coolant outlet port at a second end of the coolant conduit, and connected to the cooling manifold elements of the frame member in a communicating fashion, and wherein a first cooling manifold element is at the coolant inlet port and a second cooling manifold element is at the coolant outlet port.

2. The battery module according to claim 1, wherein each of the battery cells is configured to have a structure in which an electrode assembly, which is configured to have a structure comprising a positive electrode, a negative electrode, and a separator disposed between the positive electrode and the negative electrode, is mounted in a receiving part of a pouch-shaped battery case made of a laminate sheet comprising a resin layer and a metal layer.

3. The battery module according to claim 1, wherein the cooling manifold elements each have a structure extending through the frame member.

4. The battery module according to claim 3, wherein the cooling manifold elements each have a hollow structure extending from one surface to the other surface of the frame member, a first end and a second end, and wherein an outer diameter of the first end is equal to an inner diameter of the second end.

5. The battery module according to claim 1, wherein the cooling manifold elements of the unit modules are connected to each other in a communication fashion.

6. The battery module according to claim 5, wherein airtight gaskets are disposed at connection regions of the cooling manifold elements.

7. The battery module according to claim 1, wherein the frame member is integrally formed with the cooling member.

8. The battery module according to claim 1, wherein the coolant conduit is integrally formed with the cooling fin.

9. The battery module according to claim 1, wherein a coolant channel defined by the coolant conduit is generally formed in a U-shape.

10. The battery module according to claim 1, wherein the coolant inlet port and the coolant outlet port of the coolant conduit are located such that ends of the coolant inlet port and the coolant outlet port are directed toward a bottom of the battery module.

11. The battery module according to claim 1, wherein the frame member comprises upper end fastening extensions formed by extending in a protruding fashion opposite ends of the other side of the frame member opposite to one side of the frame member at which the cooling manifold elements are formed, and upper end fastening holes are formed in the upper end fastening extensions.

12. The battery module according to claim 1, wherein the frame member comprises one or more lower end fastening extensions extending in a protruding fashion from regions of the frame member at which the cooling manifold elements are formed, and lower end fastening holes are formed in the lower end fastening extensions.

13. The battery module according to claim 11, wherein fastening beams for fixing the unit modules at correct positions are inserted through the upper end fastening holes and the lower end fastening holes.

14. The battery module according to claim 1, wherein the cooling fin of the cooling member is provided at one side thereof at which the coolant inlet port and the coolant outlet port of the coolant conduit are located with one or more fixing and fastening extensions formed by extending portions of the cooling fin in a protruding fashion such that the fixing and fastening extensions are adjacent to the coolant inlet port and the coolant outlet port, and fixing and fastening holes are formed in the fixing and fastening extensions.

15. The battery module according to claim 14, wherein the cooling member is fixed to the frame member by inserting fixing and fastening members through the fixing and fastening holes and the frame member.

16. A battery pack comprising a battery module according to claim 1, wherein the battery pack is configured to have a structure in which a battery module assembly, which is configured to have a structure in which two or more battery modules are arranged in tight contact with each other, is loaded on a top of a tray assembly.

17. The battery pack according to claim 16, wherein the battery module assembly is configured to have a structure in which cooling manifold elements are arranged such that the cooling manifold elements are directed toward the top of the tray assembly.

18. The battery pack according to claim 16, wherein the tray assembly comprises a reinforcement bead provided at the top thereof facing the battery module assembly such that the reinforcement bead is located in a space defined between cooling manifold elements of the battery module assembly.

19. The battery pack according to claim 18, wherein the reinforcement bead has a height equivalent to 10% to 90% a distance between the battery module assembly and the top of the tray assembly in the space defined between the cooling manifold elements.

20. The battery pack according to claim 18, wherein the reinforcement bead has a width equivalent to 10% to 90% that between the cooling manifold elements in the space defined between the cooling manifold elements.

21. The battery pack according to claim 18, wherein the reinforcement bead is integrally formed on the top of the tray assembly.

22. The battery pack according to claim 18, wherein the reinforcement bead is formed on an additional member coupled to the top of the tray assembly.

23. The battery pack according to claim 16, wherein one or more fixing beams are further coupled to one surface of the battery module assembly opposite to the other surface of the battery module assembly facing the top of the tray assembly.

24. A device comprising one or more battery packs according to claim 16.

25. The device according to claim 11, wherein the device is any one selected from a group consisting of a power tool, an electric vehicle, a hybrid electric vehicle, a plug-in hybrid electric vehicle, and a power storage device.

* * * * *